United States Patent [19]

Stengaard

[11] Patent Number: 5,091,086

[45] Date of Patent: Feb. 25, 1992

[54] PERMEABLE, POROUS POLYMERIC MEMBRANE WITH HYDROPHILIC CHARACTER, METHODS FOR PREPARING SAID MEMBRANES AND THEIR USE

[75] Inventor: Flemming F. Stengaard, Nakskov, Denmark

[73] Assignee: Danisco A/S, Denmark

[21] Appl. No.: 373,696

[22] Filed: Jul. 3, 1989

Related U.S. Application Data

[63] Continuation of Ser. No. 89,550, Aug. 26, 1987, abandoned.

Foreign Application Priority Data

Aug. 27, 1986 [DK] Denmark ............................ 4079/86

[51] Int. Cl.$^5$ ............................................. B01D 69/12
[52] U.S. Cl. ........................... 210/490; 210/500.29; 210/500.37
[58] Field of Search ............... 210/500.37, 500.29, 210/490; 427/244, 245, 246; 428/290, 304, 421, 422

[56] References Cited

U.S. PATENT DOCUMENTS

| | | | |
|---|---|---|---|
| 3,620,970 | 11/1971 | Klug | 210/23 |
| 3,837,500 | 9/1974 | Nicolas et al. | 210/490 |
| 3,878,109 | 4/1975 | Ikeda et al. | 210/500.37 |
| 4,113,912 | 9/1978 | Okita | 428/290 |
| 4,242,159 | 12/1980 | Klimmek et al. | 210/500.29 |
| 4,277,344 | 7/1981 | Cadotte | 210/654 |
| 4,302,336 | 11/1981 | Kawaguchi | 210/654 |
| 4,340,482 | 7/1982 | Sternberg | 427/245 X |
| 4,388,189 | 6/1983 | Kawaguchi et al. | 210/500.37 |
| 4,413,074 | 11/1983 | Wrasidlo | 210/490 X |
| 4,432,875 | 2/1984 | Wrasidlo | 210/500.2 |
| 4,529,646 | 7/1985 | Sundet et al. | 210/654 X |
| 4,535,010 | 8/1985 | Axen et al. | 427/246 |
| 4,659,474 | 4/1987 | Perry et al. | 210/638 |
| 4,659,475 | 4/1987 | Liao et al. | 210/654 |
| 4,753,725 | 6/1988 | Lindner et al. | 210/654 |
| 4,755,299 | 7/1988 | Brueschke | 210/640 |
| 4,767,645 | 8/1988 | Lindner et al. | 427/386 |
| 4,776,959 | 10/1988 | Kasai et al. | 210/490 |
| 4,794,002 | 12/1988 | Henis et al. | 427/245 X |
| 4,798,847 | 2/1989 | Roesink et al. | 427/245 |
| 4,814,082 | 3/1989 | Wrasidlo | 210/490 |
| 4,828,980 | 5/1989 | Snyder et al. | 435/7 |
| 4,833,014 | 5/1989 | Lindner et al. | 427/333 X |

FOREIGN PATENT DOCUMENTS

| | | |
|---|---|---|
| 0066814 | 12/1982 | European Pat. Off. |
| 0221046 | 4/1987 | European Pat. Off. |
| 0227043 | 6/1987 | European Pat. Off. |
| 3129702 | 2/1982 | Fed. Rep. of Germany ........................ 210/500.37 |
| 54-17978 | 3/1979 | Japan |
| 56-147604 | 11/1981 | Japan |
| 1538810 | 12/1978 | United Kingdom |
| 8501222 | 12/1983 | World Int. Prop. O. |

*Primary Examiner*—Frank Spear

[57] ABSTRACT

Permeable, porous polymeric membrane with hydrophilic character of the membrane, said character being obtained by treatment with a solution comprising one or more hydrophilic, mono-or polymeric compounds selected among soluble, OH-containing cellulose derivatives, polyvinylalcohols and low molecular weight, polyfunctional, NH-and/or OH-containing compounds, optionally in the presence of a cross-linking agent, a surfactant and a initiator followed by rendering the layer deposited during the treatment insoluble on the membrane surface by means of a catalyst reaction at elevated temperatures in order to fixate the hydrophilic material to the membrane. Furthermore a process for the preparation of these membranes by means of treating a permeable, porous, polymeric membrane of hydrophobic character with the above solution in the presence of a catalyst and optionally in the presence of a cross-linking agent, a surfactant and an initiator, and curing of the coated membrane by means of heating to form an insoluble, hydrophilic surface layer. The membranes are suitable for use in ultra- and microfiltration.

12 Claims, No Drawings

PERMEABLE, POROUS POLYMERIC MEMBRANE WITH HYDROPHILIC CHARACTER, METHODS FOR PREPARING SAID MEMBRANES AND THEIR USE

This application is a continuation of application Ser. No. 07/089,550, filed on Aug. 26, 1987, now abandoned.

FIELD OF THE INVENTION

The invention relates to permeable, porous polymeric membranes with hydrophilic character, methods for preparing said membranes and their use for ultra- and microfiltration.

BACKGROUND ART

Ultra- and microfiltration membranes (UF- and MF membranes) are today widely used in a large number of industries for separation and concentration of solutions and suspensions.

The word membrane is in this context used to describe thin, porous films, foils and sheets, usually in form of permeable flat films, tubes or hollow fibers prepared from various organic types of polymers. UF membranes are characterized by their ability to separate macromolecules from low molecular weight compounds and salts. Membranes are specified by the molecular weight cutoff value, (MWCO). The cutoff value normally refers to well-defined macromolecules (globular proteins) and indicates that macromolecules with a molecular weight higher than the given MWCO are not allowed to pass the membrane, while molecules with a lower molecular weight more or less pass the membrane. MF membranes are characterized by their ability to retain bacteria and other microorganisms, particles, colloids etc. and are specified by the indication of their pore size e.g. determined by the so-called Bubble Point Method as stated in ASTM F316 (Standard Method of Test for Pore Size Characteristics of Membrane for use with Aerospace Fluids).

The expression "hydrophobic membrane" refers in the following to any membrane made more hydrophilic by the method according to the invention.

UF and MF membranes are used in a large number of industries, such as water processing, food, chemistry, pharmaceutics, bio-engineering, waste water processing etc., for various separation and concentration tasks, removal of particles and the like.

In order to be usable the membranes have to meet several requirements, such as

Sufficient physical strength for resisting the mechanical influences the membranes are subjected to during operation in the filtration system in question.

Good chemical resistance, allowing use of the membranes in a wide temperature and pH range in different chemical environments as well as toleration of various detergents and desinfectants.

Good transport properties (flux) and selectivity allowing a given separation/concentration task to be technically and economically feasible.

UF and MF membranes are usually made of highly resistant, synthetic polymers more or less hydrophobic by nature and displaying a great tendency for ad- and absorption of many organic compounds and colloids.

Ad- and absorption results in lower flux values as well as a flux reduction with time (fouling). At the same time the separation properties may be altered, since the ad- and absorbed material on the surface of the membranes forms a layer, said layer being able to act as a secondary membrane.

A number of the above disadvantages are avoided if hydrophilic instead of hydrophobic membranes are used, said hydrophilic membranes being easily wetted by water and known to possess low ad- and absorption of fouling materials (e.g. proteins). They generally possess an advantageously low protein binding tendency and a lesser inclination for fouling, the latter in turn resulting in advantages in form of higher flux values, lesser flux reduction with time as well as easier cleaning and lower cleaning frequency.

Furthermore, it is thus possible to obtain membranes with a lower cutoff value and the membranes may be stored in dry condition, since they are easily rewetted with water.

The British patent specification 1.538.810 describes the hydrophilization of fluoropolymers with water-soluble polymers (i.e. cellulose derivatives and polyvinylalcohol) by rendering said polymers insoluble by means of cross-linking reactions, such as heat treatment, acetalization, esterification, chemical reaction with bichromate, or by means of ionizing radiation. In the present invention, however, the water-soluble, OH-containing polymers are rendered insoluble either by formation of ether bonds between the polymer chains by means of low molecular weight cross-linking agents or by formation of chemical bonds between said polymers and a polyvinylidenefluoride and/or polyvinylidenefluoride copolymer support membrane by means of a base-catalyzed reaction. The above British patent specification does not relate to the use of the hydrophilic, porous fluorocarbon structures, while the present invention improves the properties of the membrane.

The U.S. Pat. No. 3,620,970 describes the preparation of Reverse Osmosis (RO) membranes, i.e. membranes with salt retention properties. The ultrafiltration and microfiltration membranes of the present invention possess a insignificant salt retention (ideally 0% is desired) but an improved membrane surface in order to avoid or reduce ad- and absorption/fouling during hydrophilization.

U.S. Pat. No. 4,340,482 discloses a microporous, polymeric article attaining hydrophilic properties by means of treatment with a highly alkaline solution of an amino acid, preferably glycine. The hydrophilicity is attained by means of grafting with the amino acid being a charged molecule. Membranes with charged groups display pH-related flux and permeability properties during the filtration of many products. Components with opposite charge may thus be bound to the membrane and foul said membrane, while components with the same charge are repulsed and optionally completely or partially retained during the filtration. The use of highly alkaline concentrations and high temperatures in this known method limits its application. Hydroxypropylcellulose being used i.e. in the present invention cannot be dissolved under these conditions.

The synthetic polymers usually used for the preparation of a membrane are distinctly hydrophobic, e.g. polysulfone. Natural polymers, such as cellulose and derivatives thereof, are, on the other hand, hydrophilic and today UF membranes are made of regenerated cellulose. The use of MF membranes made of regenerated cellulose has, however, been problematic because of the ability of this material to swell in water as well as its low mechanical strength due to its high porosity.

Further synthetic polymers include fluoropolymers, homopolymers as well as vinylidene fluorides, such as polyvinylidene fluoride (PVDF) generally less sensitive to fouling than polysulfone. Ultrafiltration membranes made of PVDF have been known for many years and corresponding microfiltration membranes are also produced. One technique includes adding small amounts of a partially mixable fluoro-copolymer (chlorotrifluoroethylene/vinylidene fluoride copolymer (CTFE/VF)) to the membrane solution containing besides PVDF a common solvent, optionally admixed with swelling agents/non-solvents and viscosity-increasing components. The preparation is performed with the traditional machinery in a manner known per se. Another technique makes use of the fluoro-copolymers (CTFE/VF) as sole membrane polymer, by using a high molecular weight, water-soluble polymer as pore former.

In view of the good properties of cellulose it was natural to investigate the possibility of employing the so-called thin film technique for coating polysulfone as well as the above PVDF-based MF membranes. Cellulose is not directly suitable because of its dissolving properties. Thus it is necessary to use derivatives thereof. Hydroxyethylcellulose and hydroxypropylcellulose have been proven to be suitable, since they are water soluble. In order to fixate these materials on the membrane surfaces they have to be made water-insoluble. This is done either by means of cross-linking the polymer chains or by creating a chemical bond to the support membrane. Polysulfone does not immediately present any reaction possibilities, while PVDF as well as the CTFE/VF copolymer present reaction possibilities under highly alkaline conditions and elevated temperatures. Under these conditions hydrogen fluoride/hydrogen chloride are set free while reactive groups and double bonds, the basis of an addition reaction, are formed.

According to the present invention UF and MF membranes with hydrophilic character may be provided on the basis of existing ultrafiltration and microfiltration membranes. The process includes applying an aqueous solution comprising a hydrophilic polymer and possible, reactive monomers as well as a catalyst to the "surface". Then the membrane is heated, e.g. in an oven, to a suitable temperature so that a hydrophilic "surface layer" is formed, said layer being either chemically or physically bound to the membrane material. Thus the properties of the membrane are altered in such a way that the character of the "surface layer" predominantly determines the filtration properties.

In the present specification the term "surface" in connection with membranes refers to any membrane surface being able to come in contact with the liquid to be filtered and thus not only to the outer surface of said membrane.

SUMMARY OF THE INVENTION

It is thus the object of this invention to provide novel and improved membranes with hydrophilic character, said membranes being easily wetted and possessing good separation and non-fouling properties.

Another object of the invention is to provide a method for the hydrophilization of existing membrane types based on highly resistant, synthetic hydrophobic polymers.

A further object of the invention is to show special fields of application for membranes according to the invention.

The objects of the invention are achieved by the membranes described hereinafter, the methods described hereinafter, and the application described hereinafter.

The present invention relates to a permeable, porous polymeric membrane with hydrophilic character wherein the hydrophilic character of the membrane is obtained by treatment with a solution comprising one or more hydrophilic, mono- or polymeric compounds selected among soluble, OH-containing cellulose derivatives, polyvinylalcohols and low molecular weight, polyfunctional, NH- and/or OH-containing compounds, optionally in the presence of a cross-linking agent, a surfactant and an initiator followed by rendering the layer deposited on the membrane surface insoluble on the membrane surface by means of a catalyzed reaction at elevated temperatures in order to fixate the hydrophilic material to the membrane.

The hydrophilic compounds are, as described, applied in solution. Any solvent not attacking the support membrane may be used and therefore water is usually used since it does not influence the membrane.

The theory behind the obtained results is not explained in detail and it is not desired to be bound by a specific theory, but apparently there exists a chemical bond between the hydrophilic compound and the membrane, or a physical bond (absorption) to the membrane or an intermolecular relation is obtained by the interreaction (cross-linking) between the polymer chains themselves and/or by cross-linking by means of cross-linking agents.

The invention relates more specifically to a membrane wherein its hydrophilic character is obtained by treatment with a solution comprising one or more soluble cellulose derivatives selected among hydroxyalkylcellulose and other cellulose ethers not completely substituted, preferably among hydroxyethylcellulose, hydroxypropylcellulose, methylcellulose, ethylcellulose, carboxymethylcellulose and methylhydroxyethylcellulose and/or polyvinylalcohol. Suitable cellulose derivatives are thus derivatives soluble in a wide pH range and comprising free OH-groups, which may enter into the final curing process. The cellulose polymers used as membrane coating material are furthermore generally characterized by possessing a low ad- and absorption tendency towards fouling materials, such as proteins, in such a way that such membranes according to the invention possess non-fouling properties. Among the above advantageous compounds hydroxyethyl- and hydroxypropylcellulose are at the moment preferred, since they achieve the greatest effect.

According to another, preferred embodiment of the invention the low molecular weight, polyfunctional compounds are selected among primary and secondary amines, compounds of the general formula

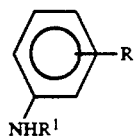

where R=—NHR$^2$, —OH, —SO$_3$H or —COOH, and R$^1$ and R$^2$ are independently either H or an alkyl group and diaminopyridines. Especially preferred low molecular weight compounds are diaminopyridines, tetraethylene pentamine, aminophenols and sulphanilic acid.

According to a further preferred embodiment of the invention the cellulose derivative is completely or partially substituted by one or more low molecular weight, polyfunctional compounds selected among primary and secondary amines, compounds of the general formula

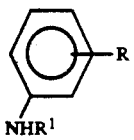

where $R = -NHR^2$, $-OH$, $-SO_3H$ or $-COOH$, and $R^1$ and $R^2$ are independently either H or an alkyl group, and diaminopyridines.

The invention further relates to a process for preparing permeable, porous polymeric membranes, said process being wherein a permeable, porous, polymeric membrane with hydrophobic character is treated with a solution comprising one or more hydrophilic, monomeric or polymeric compounds selected among soluble, OH-containing cellulose derivatives polyvinylalcohols as well as low molecular weight, polyfunctional, NH- and/or OH-containing compounds in the presence of a catalyst and optionally in the presence of a cross-linking agent, a surfactant, and an initiator, said coated membrane being subsequently cured by means of heating until an insoluble, hydrophilic surface coat is formed. In the process according to the invention the hydrophilicity is obtained by means of treatment with preferably high molecular weight compounds. Thus it is possible to simultaneously influence the cutoff properties of the UF membranes, i.e. to prepare "tighter" membranes than those known in connection with hydrophobic membrane material in question. The method is unusually simple and suitable for treating flat membranes. The chosen solutions may be applied to the surface of the membrane by means of e.g. a spreading technique, using a falling film of liquid or a spray. In those cases where it is important that also the inner membrane surfaces (pores) should be modified in connection with the filtration of fouling materials not retained by the outer surface of the membrane, a dipping technique is advantageously used for the application. For those purposes it is preferred to use the low molecular weight compounds, especially for filtration purposes, where membranes with small pore size are involved.

In a preferred embodiment of the process according to the invention the curing is performed by heating the membrane in a ventilated oven, said membrane advantageously passing through the oven at a suitable temperature, e.g. between 100° C. and 175° C., for a suitable period, e.g. from 3 to 60 min. Other ways of heating may of course also be used, such as the use of radiation heat.

In a preferred embodiment of the process according to the invention the treatment is performed in the presence of a common inorganic base, preferably sodium hydroxide, or a common inorganic acid, preferably concentrated sulphuric acid, as a catalyst. In this connection it should be mentioned that the choice of catalyst is adapted to the solubility of the chosen coating material in alkaline or acidic medium respectively. Furthermore it should be mentioned that if the reactant is a highly alkaline amine it may at the same time act as a catalyst for the reaction.

In a preferred embodiment of the process according to the invention a membrane is treated with a solution comprising hydroxyalkylcellulose in the presence of an inorganic base as a catalyst, such as NaOH, possible a cross-linking agent, such as a compound with the general formula $R^3\text{-}(CHOH-CH_2-X)_n$, where X is a halogen atom, preferably chlorine, $R^3$ is an alkyl group that may include one or more oxygen or halogen atoms or a direct bond or an ether bond, and n is an integer equal to or larger than 1, such as 1,3-dichloro-2-propanol, as well as optionally a surfactant, such as sodiumdodecyl sulphate.

The optionally used cross-linking agent is, as shown, a difunctional compound being able to react with hydroxyalkylcellulose and to form cross links between the polymer chains. 1,3-dichloro-2-propanol, for example, forms ether bonds with hydroxyalkylcellulose via the OH groups. Other suitable cross-linking agents include ethyleneglycoldichlorohydrine, glyceroldichlorohydrine, glyceroltrichlorohydrine, sorbitoldichlorohydrine, sorbitoltrichlorohydrine and sorbitoltetrachlorohydrine.

Surfactants are used to facilitate the wetting of the hydrophobic membrane with the coating material solution. Suitable surfactants include compounds with no negative influence on the desired membrane, such as sodiumdodecyl sulphate (SDS).

In another preferred embodiment of the process according to the invention a PVDF-, CTFE/VF- or a PVDF-CTFE/VF-membrane is treated with a solution comprising hydroxyalkyl cellulose in the presence of an inorganic base as catalyst, such as NaOH, optionally a cross-linking agent, such as a compound with the general formula $R^3\text{-}(CHOH-CH_2-X)_n$, where X is a halogen atom, preferably chlorine, $R^3$ is an alkyl group that may include one or more oxygen or halogen atoms or a direct bond or an ether bond, and n is an integer equal to or larger than 1, such as 1,3-dichloro-2-propanol, as well as optionally a surfactant, such as sodiumdodecyl sulphate.

In such a base-catalyzed reaction between the coating material and the membrane material, PVDF, CTFE/VF and PVDF-CTFE/VF set free HF/HCl and form reactive centres for chemical bonds (grafting) under basic conditions and at high temperatures. The reaction mechanism for hydroxyalkylcellulose is, as mentioned before, not explained, but the result of the treatment is that hydroxyalkylcellulose is bound to the membrane material.

In yet another preferred embodiment of the process according to the invention the cellulose derivative is completely or partially substituted by one or more low molecular weight, polyfunctional, NH- and/or OH-containing compounds, preferably selected among diaminopyridines, tetraethylene pentamine, aminophenols, and sulfanilic acid. In such cases a basic catalyst, such as NaOH is used.

In a further preferred embodiment of the process according to the invention a membrane is treated with a solution comprising a hydroxyalkylcellulose and/or a polyvinylalcohol in the presence of an inorganic acid, preferably sulphuric acid, as catalyst, optionally a cross-linking agent selected among polyols, such as sugars, e.g. gluconic acid or sorbitol, inositol, pentaerythrite, aromatic hydroxycompounds, e.g. 2,5-dihydroxybenzene sulfonic acid or 4,5 dihydroxy-b 1,3-benzenedisulfonic acid, polyoxyethylene sorbitane esters, polyfunctional acids, such as polyacrylic acid, polyfunctional esters, such as dimethyltartrate and diethyltartrate, and polyfunctional, unsaturated compounds, such as triallyl-1,3,5-triazine-2,4,6-trione, as well as a peroxide compound as initiator if required. Suitable peroxide compounds include alkaline metal peroxodisulphates, such as potassium peroxodisulphate The reaction mechanism of the above acid-catalyzed reaction is not explained either. It is, however, assumed, that the OH groups of the hydroxyalkylcellulose and the polyvinylalcohols form ester or ether bonds with subsequent cross-linking of the polymer chains under acidic conditions, at high temperatures and in the presence of a cross-linking agent.

In another, further preferred embodiment of the process according to the invention a polysulfone, a PVDF-, CTFE/VF- or a PVDF-CTFE/VF-membrane is treated with a solution comprising a hydroxyalkylcellulose and/or a polyvinylalcohol in the presence of an inorganic acid, preferably sulphuric acid, as catalyst, optionally a cross-linking agent selected among polyols, such as sugars, e.g. gluconic acid or sorbitol, inositol, pentaerythrite, aromatic hydroxycompounds, e.g. 2,5-dihydroxybenzene sulfonic acid or 4,5 dihydroxy-1,3-benzenedisulfonic acid, polyoxyethylene sorbitane esters, polyfunctional acids, such as polyacrylic acid, polyfunctional esters, such as dimethyltartrate and diethyltartrate, and polyfunctional, unsaturated compounds, such as triallyl 1,3,5-triazine-2,4,6-trione, as well as a peroxide compound as initiator if required.

The hydrophilic character of the membranes prepared according to the invention is determined by measuring the ability of said membranes to be wetted with water. The measure for the ability to be wetted is the contact angle air water-membrane determined by the measuring method according to SCAN p. 18-66 (Scandinavian Pulp, Paper and Board Testing Committee), since it holds that the smaller the contact angle the better the ability to be wetted.

Furthermore the invention relates to the application of hydrophilic, permeable, porous, polymeric membranes described for ultrafiltration and microfiltration.

The principle of surface treatment can be shortly summarized as follows with the hydrophilic compound being represented by hydroxyalkylcellulose and the catalytic reaction being basic and acidic respectively.

An aqueous solution of hydroxyalkylcellulose is prepared, and rendered alkaline by adding sodium hydroxide. A microfiltration membrane is coated with the solution by dipping or pouring and excess solution is removed by draining or squeezing. The membrane treated this way is then transferred to a ventilated oven with a temperature of between 120°-150° C. for a suitable period, e.g. 10-15 min. The effect of this treatment is evident from measuring the altered ability of the membrane to be wetted (the contact angle is decreased, as mentioned a sign for the hydrophilization of the surface) as well as from measuring the increased flux values when filtering e.g. skimmed milk. Thus a fixation of the hydroxyalkylcellulose onto the membrane surface is proven. The hydroxyalkylcellulose in the aqueous solution may completely or partially be substituted by various low molecular weight, polyfunctional NH- and/or OH-containing compounds. In order to achieve a further fixation of the hydroxyalkylcellulose a cross-linking agent, such as 1,3-dichloro-2-propanol, may be added to the reaction solution.

If an acid-catalyzed reaction is chosen, a cross-linking agent as well as an acid are added to the aqueous solution of hydroxyalkylcellulose. This mixture is then treated as described above, i.e. the membrane is coated and heat-treated.

The basic membrane is preferably prepared of polyvinylidene fluoride, chlorotrifluoroethylene/vinylidene fluoride copolymer, polysulfones or mixtures of polyvinylidene fluoride and chlorotrifluoroethylene/vinylidene fluoride copolymer.

After the application the water-soluble cellulose derivative is rendered insoluble and fixated onto the membrane material by means of heating, e.g. oven treatment.

DESCRIPTION OF THE PREFERRED EMBODIMENT

Description of the preparation of known permeable membranes

Polymeric membranes are usually prepared from a solution of the corresponding polymeric material in suitable solvents. The solution is shaped to form a thin film, a tube or a hollow fiber whereupon the polymeric material is precipitated under controlled conditions. The precipitation may e.g. be performed by means of vaporization of the solvent or by means of contacting the polymeric solution with a non-solvent. U.S. Pat. No. 3,615,024 describes such a method for the preparation of porous, permeable, polymeric membranes. In the book "Reverse Osmosis/Ultrafiltration Process Principles" by S. Sourirajan and Takeshi Matsuura, National Research Council, Canada, 1985, NRCC no. 24188 on p. 788-792 there is a description of the technique for preparing flat membranes. An article by Douglas R. Lloyd and Timothy B. Meluch in "Material Science of Synthetic Membranes", D. R. Lloyd, editor, ACS-symposium Series 269, American Chemical Society, Washington D.C., 1985, p. 1-21 mentions examples of a number of different polymeric materials usable for the preparation of membranes.

The membranes are often directly produced on a support surface thus constituting an integrated part of the final membrane and providing good mechanical strength. The UF and MF types used in the present invention are thus reinforced with a support surface of non-woven polypropylene.

Preparation of microfiltration membranes based on a mixture of PVDF-homopolymers and CTFE/VF-copolymers (the types used in the examples):

The preparation method is based on the same principles as the above method (phase inversion membranes), whereas the line of procedure enables a "control" of the pore size of the membranes (bubble point).

The basic polymer used is PVDF dissolved in a suitable concentration in a suitable solvent or a suitable solvent mixture. To this mixture is then added
a) a fluoropolymer (PVDF-CTFE/VF-copolymer) soluble in the chosen solvent for PVDF and partially mixable with PVDF in said solvent,
b) optionally a water-soluble, high molecular weight polymer (polyvinylpyrrolidone) soluble in the above solvent and mixable with the PVDF-CTFE/VF-mixture.

Principle

The addition of additive a is to a great extent decisive for the pore size of the final membrane. An increase in concentration causes an increase in pore size, as shown by measuring the bubble point. The amount of additive a may vary greatly depending on the PVDF concentration, the solvent, the concentration of additive b and the temperature of the solution. Preferably, however, 2-20% of additive, based on the PVDF content, is used.

The addition of additive b influences the pore size to a lesser extent, it is, however, predominantly added because of its viscosity-increasing properties. The viscosity is important for the spreading on the non-woven support material. If the viscosity is too low, the solution penetrates deeply into the support layer after having been applied and causes surfaces defects because of insufficient cover. Too high viscosity, on the other hand, causes minimal penetration and thus insufficient adhesion to the support layer. The swelling effect of the additive on the solution causes a larger porosity in the final membrane but also a decrease of its mechanical strength. Preferably 5-25% of additive, based on the PVDF-content, is used.

The spreading parameters may be varied and especially the precipitation temperature influences the pore size.

Example of the preparation of MF support membranes

A solution is prepared comprising 18.5% polyvinylidene fluoride (Dyflor 2000® from Dynamit Nobel), 1,5% chlorotrifluoroethylene/vinylidene fluoride copolymer ("Kel-F" 800 Resin from 3M Company) and 80% N-methylpyrrolidone. Then 5% polyvinylpyrrolidone (Kollidon® 90 from BASF), based on the total amount of the solution, is added. The solution is spread 0.15 mm thick on a non-woven polypropylene material being conveyed on an endless steel band at a speed of 6.5 m/min. After approx. 5 sec the spread layer is precipitated by means of dipping into a water bath of 25° C. to form a microfiltration membrane. The water permeability of the membrane was 862 $l/m^2/h$, measured for pure water in a RO Division Lab. 20 module of De Danske Sukkerfabrikker (DDS). After drying the bubble point was measured to be 250 mbar, using 2-propanol as wetting agent.

The invention is further explained in the following examples.

EXAMPLE 1

An aqueous solution is prepared comprising 0.5% by weight/volume of hydroxyalkylcellulose as well as 1% by weight/volume of NaOH.

An asymmetric UF membrane made of PVDF and with a cutoff value of 30,000 (DDS RO membrane type FS50PP) is streched on a steel frame and dipped into the above solution for 2 min. The membrane is then removed from the solution and kept in a vertical position for 1 min so that excess liquid may drain off, whereupon the membrane is placed in a ventilated oven for 15 min at 150° C.

The membrane is tested for the ability to be wetted by measuring the contact angle with water, obtaining the following result:

contact angle = 25.5°

Measuring the contact angle of an untreated, dry membrane gives the following result:

contact angle = 68.9°.

EXAMPLES 2.4

Different aqueous solutions are prepared, their compositions being described in TABLE 1 below. The membrane type FS50PP is treated as described in Example 1 and the following results are obtained:

TABLE 1

| Example No. | Composition | Contact Angle |
|---|---|---|
| 2 | 0.5% hydroxypropylcellulose<br>1% NaOH | 43° |
| 3 | 0.5% hydroxyethylcellulose<br>1% NaOH<br>0.5% 4-aminophenol | 0° |
| 4 | 0.5% hydroxypropylcellulose<br>1% NaOH<br>1% 1,3-dichloro-2-propanol | 56° |

EXAMPLES 5-8

In stead of an asymmetric UF membrane an asymmetric MF membrane is used in these examples, said MF membrane comprising a mixture of PVDF and CTFE/VF-copolymer but with a bubble point 500 mbar measured with water as wetting agent.

The procedure is as described in Example 1, the dipping period, however, being 5 min and in Example 7 15 min.

The results are shown in TABLE 2.

TABLE 2

| Example No. | Composition | Contact Angle | Bubble Point (H$_2$O) |
|---|---|---|---|
| 5 | 0.4% hydroxyethylcellulose<br>1% NaOH<br>0.5% SDS | 29° | 370 |
| 6 | 0.2% hydroxyethylcellulose<br>1% NaOH<br>1% 2-aminophenol<br>0.5% SDS | 48° | 380 |
| 7 | as Example 6 | 10° | 380 |
| 8 | untreated, reference | 76° | 500 |

EXAMPLES 9-12

These examples illustrate changes in the properties of the UF membranes when treated according to the invention with regard to cutoff value and influence of fouling materials.

For the experiments an asymmetric PVDF ultrafiltration membrane with a cutoff value of 20,000 (DDS RO type FS61PP) is used. Solutions are prepared as described in TABLE 3 below and the treatment is performed as described in Example 1, the oven treatment may, however, vary as shown. The membranes are tested in the laboratory module (lab. unit 20) of DDS RO Division by measuring the flux and permeability data of different test solutions. The results are shown in TABLES 4 and 5.

TABLE 3

| Example No. | Composition | Oven treatment Temperature/Time |
|---|---|---|
| 9 | 0.6% hydroxypropylcellulose<br>2% NaOH | 150° C./5 min |
| 10 | as Example 9 | 150° C./30 min |
| 11 | 1% hydroxyethylcellulose<br>2% NaOH<br>0.5% 1,3-dichloro-2-propanol<br>0.5% SDS | 150° C./15 min |
| 12 | 0.2% hydroxypropylcellulose<br>1% NaOH<br>0.5% 1,3-dichloro-2-propanol<br>0.5% SDS | 150° C./15 min |

TABLE 4

| Ex. No. | Press/Temp bar/°C. | Water Flux l/m²/h | 10% Sugar Solution Press/Temp bar/°C. | flux (lm²/h) | % permeability |
|---|---|---|---|---|---|
| 9 | 5/20 | 95 | 5/20 | 53 | 88 |
| 10 | 5/20 | 26 | 5/20 | 19 | 82 |
| 11 | 10/20 | 43 | 10/20 | 27 | 69 |
| 12 | 5/20 | 41 | 5/20 | 22 | 83 |
| FS61PP-untreated | 2/20 | 169 | 5/20 | 151 | 95 |

TABLE 5

Measurement of the water flux before and after the membrane has been exposed to a 5% whey powder solution having recirculated in the sysgtem for 1 h at a pressure of 5 bar and a temperature of 20° C.

| Example No. | Water Flux before l/m²/h | Water Flux after l/m²/h | Flux Decrease |
|---|---|---|---|
| 9 | 95 | 86 | 9% |
| 10 | 26 | 25 | 4% |
| 11 | 43 | 39 | 9% |
| 12 | 41 | 41 | 0% |
| FS61PP (reference) | 160 | 72 | 55% |

EXAMPLES 13-24 and REFERENCE EXAMPLES 1-1, 2-1 and 2-2.

These examples illustrate the changes in flux properties of the microfiltration membranes when treated according to the invention and subsequently tested on a "known" protein solution (skimmed milk).

The composition of the treatment solutions, the dipping times and the oven treatment are shown in TABLE 6. Two types of microfiltration membranes are used. Type 1 has an isopropanol bubble point at 250 mbar and Type 2 has an isopropanol bubble point at 150 mbar.

TABLE 6

| Ex. No. | Membrane type | Composition of treatment solution | Dipping time min | Oven treatment °C./min |
|---|---|---|---|---|
| 13 | 1 | 0.4% hydroxypropylcellulose<br>1% NaOH<br>2% 1,3-dichloro-2-propanol | 2 | 150/15 |
| 14 | 2 | as Example 13 but 0.5% SDS added | 2 | 150/15 |
| 15 | 1 | 0.4% hydroxyethylcellulose<br>0.4% polyacrylic acid (MW 5000)<br>0.5% conc. sulphuric acid | 2 | 150/15 |
| 16 | 1 | 0.2% hydroxyethylcellulose<br>2% 2,6-diaminopyridine<br>2% 1,3-dichloro-2-propanol<br>1% NaOH | 2 | 150/15 |
| 17 | 2 | 0.4% hydroxyethylcellulose<br>2% triallyl-1,3,5-triazine-2,4,6-trione<br>0.5% conc. sulphuric acid<br>0.2% potassium peroxosulphate<br>0.5% SDS | 2 | 150/15 |
| 18 | 1 | 1% hydroxyethylcellulose<br>2% 2-aminophenol<br>2% NaOH | 2 | 150/15 |
| 19 | 1 | 0.5% hydroxypropylcellulose<br>1% NaOH | 15 | 150/15 |
| 20 | 1 | as Example 19, but 0.5% tetraethylene pentamine added | 15 | 150/15 |
| 21 | 1 | 0.5% hydroxypropylcellulose<br>2% sulfanilic acid<br>1% NaOH | 1 | 150/15 |
| 22 | 2 | 0.5% hydroxyethylcellulose<br>0.5% triallyl-1,3,5-triazine-2,4,6-trione<br>0.5% conc. sulfuric acid | 1 | 150/15 |
| 23 | 1 | 0.4% hydroxypropylcellulose<br>1% NaOH<br>0.5% 1,3-dichloro-2-propanol | 15 | 150/15 |
| 24 | 1 | 5% sulfanilic acid<br>2% NaOH | 2 | 150/15 |
| 1-1 | 1 | untreated | | |
| 2-1 | 2 | untreated | | |
| 2-2 | 2 | untreated | | |

TABLE 7

Test data: 20 cm lab. module, flux = 8 l/min, temperature 20° C.

| Ex. No. | Test Solution | Pressure bar | Flux l/m²/h | Dry matter permeability % |
|---|---|---|---|---|
| 13 | skimmed milk | 2 | 296 | 97 |
| 14 | skimmed milk | 2 | 621 | 100 |
| 14 | 5% whey powder sol. | 5 | 100 | 98.5 |
| 15 | skimmed milk | 2 | 224 | 95 |
| 16 | skimmed milk | 2 | 316 | 99 |
| 17 | skimmed milk | 2 | 724 | 100 |
| 17 | 5% whey powder sol. | 5 | 110 | 97 |
| 18 | skimmed milk | 2 | 272 | 97 |
| 19 | skimmed milk | 2 | 250 | 99 |
| 20 | skimmed milk | 2 | 352 | 100 |
| 21 | skimmed milk | 2 | 310 | 100 |
| 22 | 5% whey powder sol. | 5 | 172 | 100 |
| 23 | skimmed milk | 2 | 259 | 98 |
| 24 | skimmed milk | 2 | 200 | 93 |
| 1-1 | skimmed milk | 2 | 75 | 82 |
| 2-1 | skimmed milk | 2 | 414 | 99 |
| 2-2 | 5% whey powder sol. | 5 | 86 | 85 |

As shown in TABLE 7 the microfiltration membranes treated according to the invention possess considerably improved properties compared to the untreated membranes with regard to flux and dry matter permeability, and adsorption phenomena are thus less important. These conditions are of great importance for an industrial application of the microfiltrations.

EXAMPLE 25

An asymmetric UF membrane made of PVDF with a cutoff value of approx. 30,000 MW is subjected to the following surface treatment.

An aqueous solution comprising 0.2% hydroxypropylcellulose (MW 100.000), 4% sulfanilic acid and 4% NaOH is poured on the surface. After approx. 1 min the excess liquid is removed by means of a squeeze roller and the membrane is transferred to an oven at 120° C. for 5 min.

A UF test in the lab. unit 20 of DDS RO Division revealed the following results by measuring on skimmed milk as well as on whey powder solution (and on the untreated basic membrane as reference):

lab. 20, flux 8 l/min, temp: 20° C., pressure: 4 bar, flux measured after 1 h recirculation

|  | Membrane acc. to Example 25 | Reference membrane, untreated |
|---|---|---|
| skimmed milk | 53 l/m$^2$/h | 42 l/m$^2$/h |
| 5% whey powder | 70 l/m$^2$/h | 56 l/m$^2$/h | membranes (DDS type GR$^{61}$PP, GR$^{81}$PP, and GR$^{90}$PP) are also shown in TABLE 9.

TABLE 8

| Example No. | support membrane | treatment solution composition | oven treatment °C./min |
|---|---|---|---|
| 26 | PESF | 1% hydroxyethylcellulose<br>2.5% inositol<br>2.5% conc. sulphuric acid | 120/9 |
| 27 | PVDF | 0.25% hydroxypropylcellulose MW 1,000,000<br>1.25% inositol<br>1.25% conc. sulphuric acid | 120/9 |
| 28 | PESF | 0.5% hydroxypropylcellulose MW 1,000,000<br>5% gluconic acid<br>3.75% conc. sulphuric acid | 120/9 |
| 29 | PESF | 0.25% polyvinylalcohol MW 125,000<br>0.5% penterythritol<br>0.5% 4,5-dihydroxy-1,3-benzenedisulfonic acid (Tiron ®)<br>0.5% TWEEN ® 20<br>3.75% conc. sulphuric acid | 120/9 |

TWEEN ® 20 = polyoxyethylenesorbitane ester

TABLE 9

Measuring results:
DDS lab. 20 module, flux 8 l/min. temp. 20° C.

| | % permeability[1] | | | | | flux (l/m$^2$/h) | |
|---|---|---|---|---|---|---|---|
| Ex. | sucrose | dextran (0.5%) | | PFP[2] (5%) | vitamin B$_{12}$ | skimmed milk | |
| No. | (10%) | MW 10,000 | MW 4–6,000 | MW 23,000 | (50 mg/l) | 2 bar | 4 bar |
| 26 | 98 | 23 | | 28 | | 34 | 41 |
| 27 | 91 | 15 | | 28 | | 38 | 41 |
| GR61PP | 96 | 15 | | 22 | | 23 | 37 |
| 28 | 91 | | 44 | 7 | | 6.0 | 9.5 |
| GR81PP | 91 | | 40 | 9 | | 4.3 | 6.9 |
| 29 | 81 | | 6 | | 27 | 13.8[3] | 25.4 |
| GR90PP | 79 | | 8 | | 23 | 2.6[3] | 5.2 |

[1] measured at a pressure of 5 bar except for dextran, MW 10,000, the latter was measured at 2 bar
[2] PVP — polyvinylpyrrolidone
[3] measured at 5 bar
[4] measured at 10 bar solution

EXAMPLES 26–29

These examples illustrate the changes in the properties of a UF membrane when treated according to the invention with respect to permeability properties and achieved flux value under filtration of skimmed milk. The latter shows improved values compared to existing UF membranes with comparable permeability properties.

The support membranes used in Examples 26–29 are either polyvinylidene fluoride (PVDF)-based or polyethersulfon (PESF)-based. The composition of the solutions used as well as the oven treatment time and the oven temperature are shown in TABLE 8. Using the same method as described in Example 25 hydrophilic, surface-treated UF membranes are prepared. The measuring results and the test solutions are described in TABLE 9. Data of known, untreated UF

REFERENCE EXAMPLE 3

Example of the preparation of MF support membrane made of CTFE/VE-copolymer.

A homogeneous N-methyl-2-pyrrolidone solution comprising 25% chlorotrifluoroethylene (CTFE)/vinylidene fluoride (VF)-copolymer (3M Company-Kel F 800 resin) is prepared. 5% polyvinylpyrrolidone (Kollidon ® 90 from BASF) is added and completely dissolved in said copolymer to form a homogeneous casting solution.

The solution is spread by means of a knife on a nonwoven polypropylene material (100 g/m$^2$-thickness approx. 200 micron) to form a 150 micron thick layer conveyed on an endless steel and with a speed of 6.7 m/min. After approx. 5 s the material is dipped into water of 25° C. Thus the polymer is precipitated and forms a microfiltration membrane. The membrane has a bubble point in 2-propanol of 150 mbar.

EXAMPLES 30 AND 31

Microfiltration Membrane Made of Fluoro-copolymer as Support Membrane

A microfiltration membrane is prepared from a CTFE/VF-copolymer according to the reference example 3 and with a bubble point in 2-propanol of 150 mbar and is subjected to the same treatment as described in Example 1, using the following aqueous solutions:

| Example No. | composition | oven treatment temp./time |
| --- | --- | --- |
| 30 | 5% sulfanilic acid 5% NaOH | 125° C./15 min |
| 31 | 0.5% hydroxypropyl-cellulose MW 100,000 5% sulfanilic acid 5% NaOH | 125° C./15 min |

Test data: 20 cm lab. module, flux 8 l/min, temp. 20° C.

| Ex. No. | test solution | pressure bar | flux l/m²/h | dry matter permeability |
| --- | --- | --- | --- | --- |
| 30 | 5% whey powder sol. | 2 | 164 | 100% |
|  | 5% whey powder sol. | 4 | 417 | 100% |
| 31 | 5% whey powder sol. | 2 | 114 | 100% |
|  | 5% whey powder sol. | 4 | 266 | 100% |
| ref* | 5% whey powder sol. | 2 | 31 | 95% |
|  | 5% whey powder sol. | 4 | 153 | 100% |

*untreated CTFE/VF support membrane as used in Examples 30 and 31.

I claim:

1. A permeable, porous polymeric ultrafiltration or microfiltration membrane with hydrophilic character comprising: a permeable porous polymeric membrane; and a hydrophilic surface layer having hydrophilic character deposited on the porous polymeric membrane; obtained by the treatment of the porous polymeric membrane surface with a solution comprising one or more hydrophilic mono- or polymeric compounds selected from the group consisting of soluble cellulose derivatives, polyvinyl alcohols, and low molecular weight polyfunctional, NH or OH— containing compounds, followed by rendering the layer deposited during the treatment insoluble on the porous polymeric membrane surface by means of a base catalysed reaction at elevated temperatures in order to chemically bind the hydrophilic surface layer to the porous polymeric membrane; wherein the hydrophilic surface layer predominantly determines the filtration properties.

2. Membrane according to claim 1 wherein the cellulose derivative is completely or partially substituted by one or more low molecular weight, polyfunctional compounds selected from the group consisting of diaminopyridines and primary and secondary amines, of the general formula

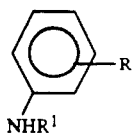

where R is —NMR², —OH, —SO₃H or —COOH, and R¹ and R² are independently either H or an alkyl group.

3. Membrane according to claim 1 wherein the low molecular weight, polyfunctional compounds are selected from the group consisting of diaminopyridines and primary and secondary amines, of the general formula

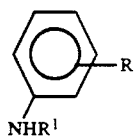

where R is —NHR², —OH, —SO₃H or —COOH, and R¹ and R² are independently either H or an alkyl group.

4. The membrane according to claim 3 wherein the treatment solution comprises one or more soluble cellulose derivatives and one or more low molecular weight polyfunctional NH- or OH containing compounds.

5. The membrane according to claim 4 wherein the treatment solution is water based.

6. The membrane according to claim 5 wherein the cellulosic derivative is water soluble and selected from the group consisting of hydroxyethyl cellulose, hydroxymethyl cellulose, methyl cellulose, ethyl cellulose, carboxymethyl cellulose and methyl hydroxyethyl cellulose.

7. A membrane according to claim 6 wherein the low molecular weight, polyfunctional NH- or OH-containing compound is selected from the group consisting of diaminopyridines, tetraethylene pentamine, aminophenols and sulfanilic acid.

8. A membrane according to claim 7 wherein the soluble cellulose derivative is selected from the group consisting of hydroxyethyl cellulose, and hydroxypropyl cellulose; and the low molecular weight polyfunctional NH- or OH containing compound is selected from the group consisting of sulfanilic acid, 2,6-diaminopyridine, 2-aminophenyl and 4-aminophenol; and the base is sodium hydroxide.

9. A membrane according to claim 1, wherein the treatment of the membrane surface is performed in the presence of at least one cross-linking agent, surfactant or initiator.

10. A membrane according to claim 9 wherein the treatment of the porous polymeric membrane surface is performed in the presence of a crosslinking agent.

11. A membrane according to claim 10 wherein the treatment solution is water based.

12. A membrane according to claim 11 wherein the hydrophilic mono- or polymeric compound is a water soluble cellulose derivative selected from the group consisting of hydroxyethyl cellulose, hydroxymethyl cellulose, methyl cellulose, ethyl cellulose, carboxymethyl cellulose, and methyl hydroxyethylcellulose.

* * * * *

UNITED STATES PATENT AND TRADEMARK OFFICE
CERTIFICATE OF CORRECTION

PATENT NO. : 5,091,086

DATED : Feb. 25, 1992

INVENTOR(S) : Flemming F. Stengaard

It is certified that error appears in the above-identified patent and that said Letters Patent is hereby corrected as shown below:

<u>Column 16</u>

In Claim 2, line 10, please delete "$NMR^2$" and insert therefor --$NHR^2$--.

Signed and Sealed this

Twenty-first Day of September, 1993

Attest:

Attesting Officer

BRUCE LEHMAN

Commissioner of Patents and Trademarks